Nov. 15, 1966  P. RICHTER ETAL  3,285,217
HATCH COVER ASSEMBLY
Filed Feb. 18, 1965  5 Sheets-Sheet 1
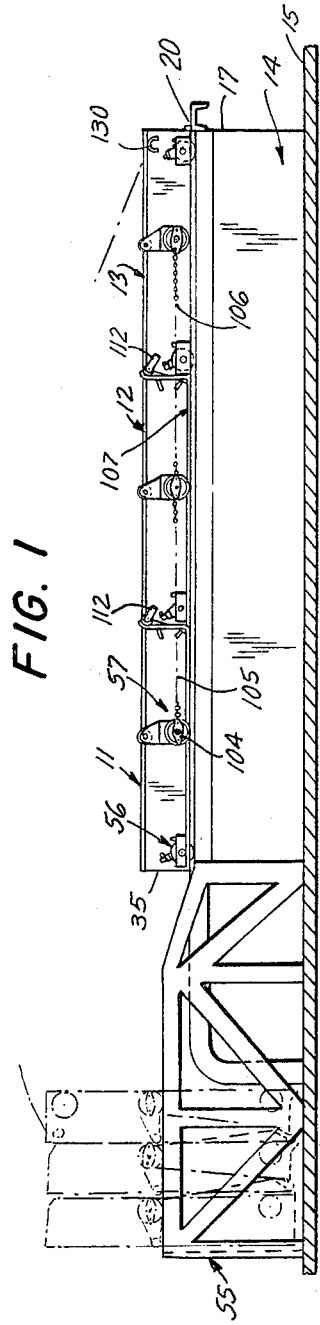
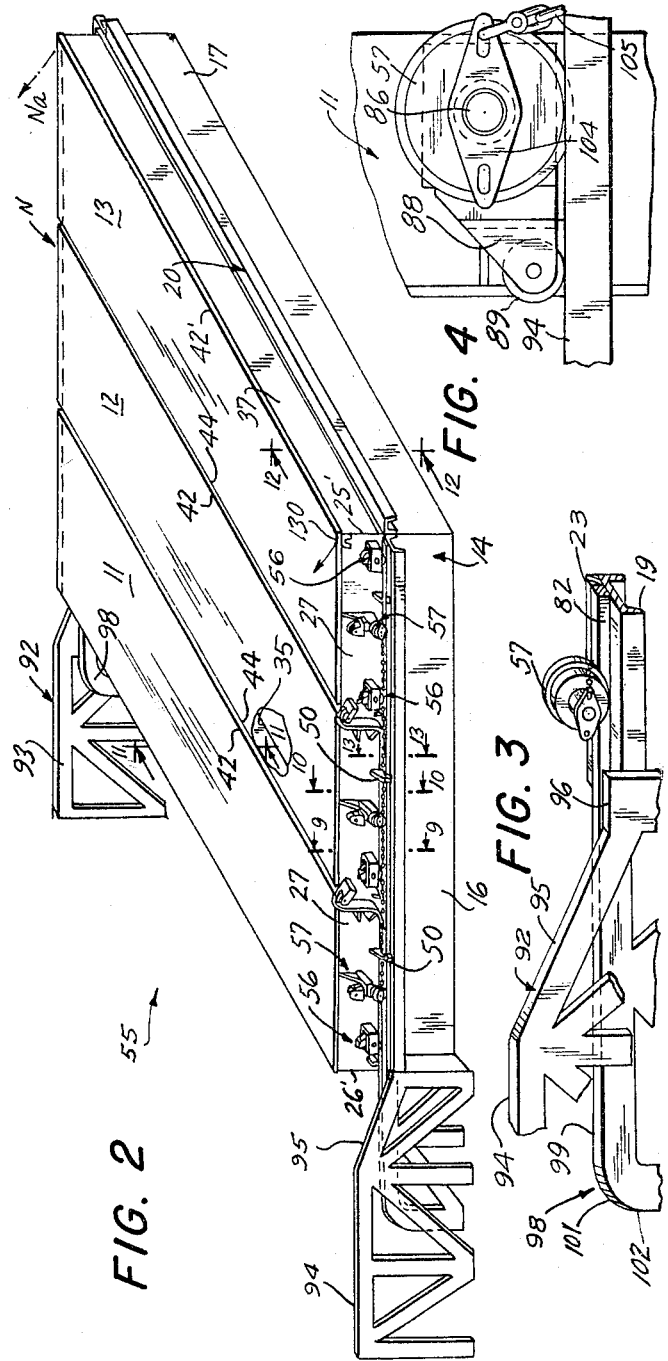
INVENTORS
PHILIP RICHTER
FRANCIS J. LUIPERSBECK
WILLIAM A. CZARNECKI
BY Dean, Fairbank & Hirsch
ATTORNEYS

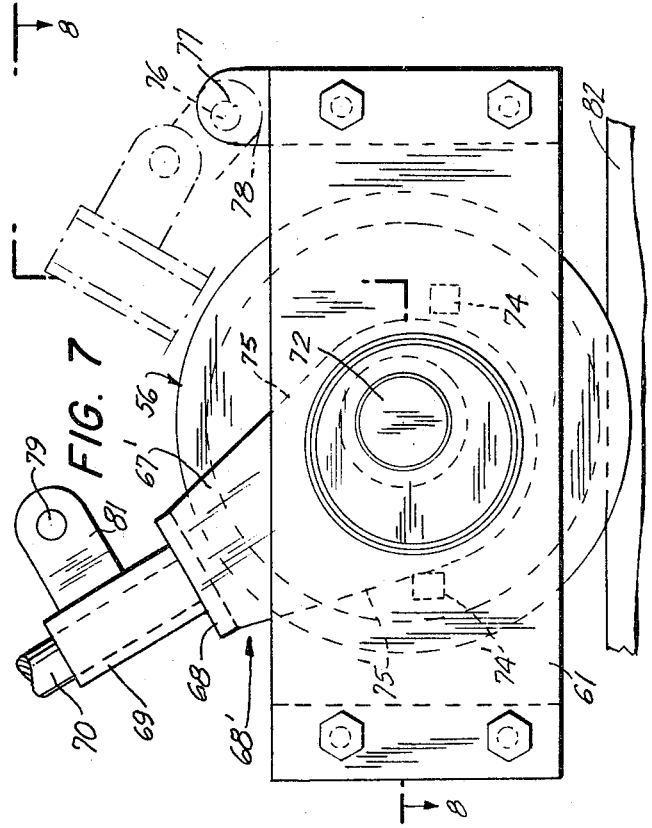
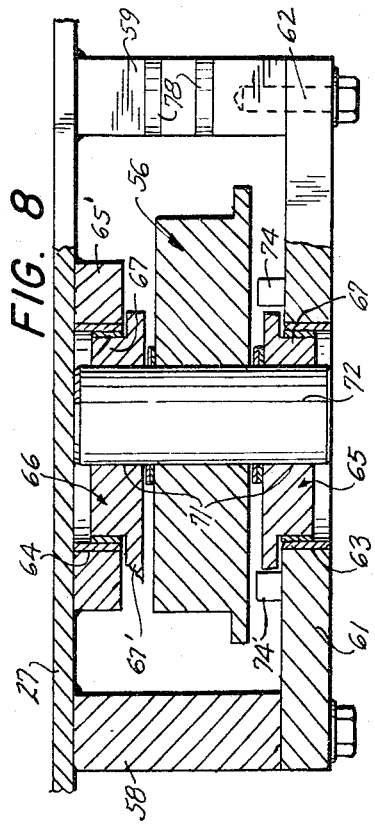
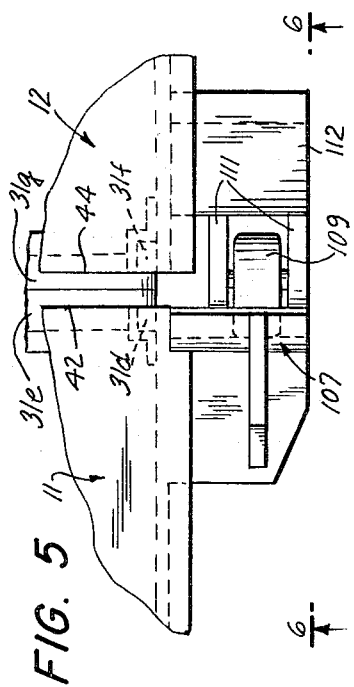
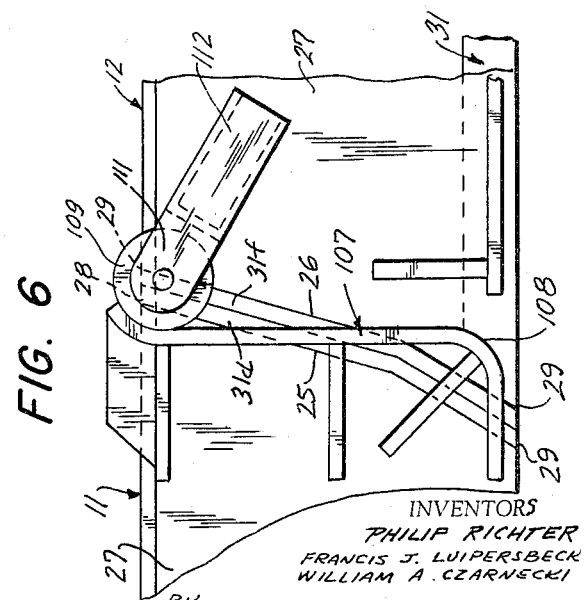

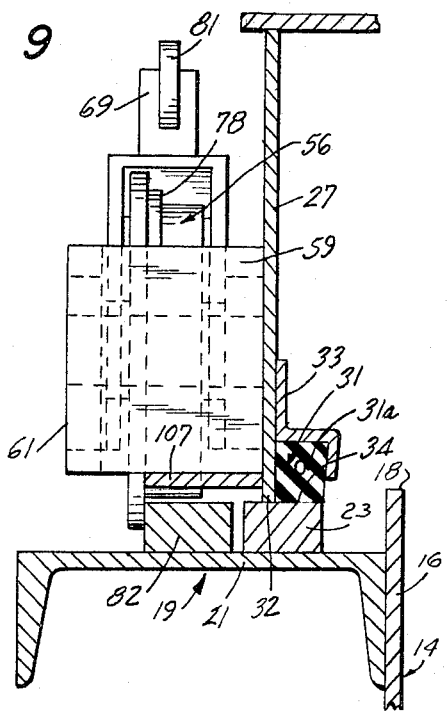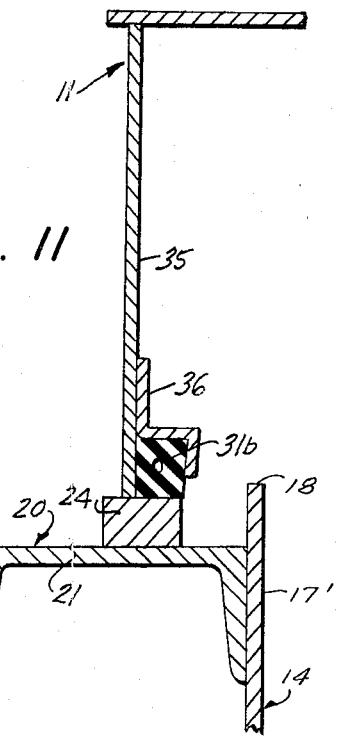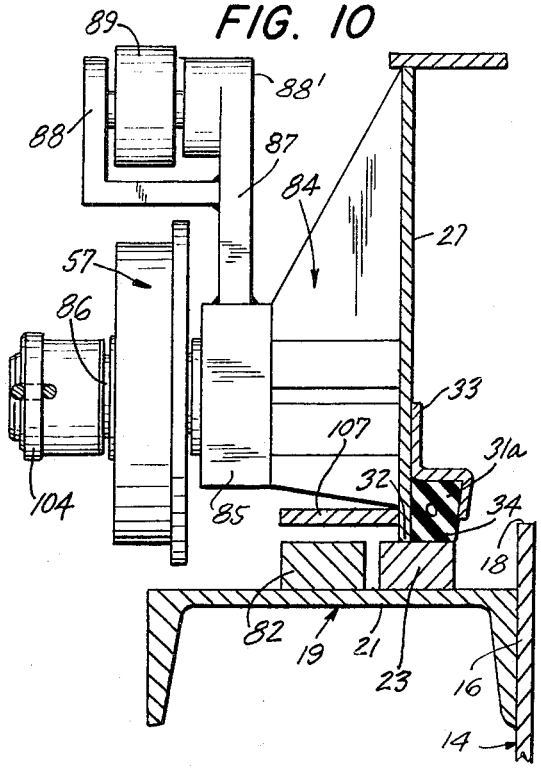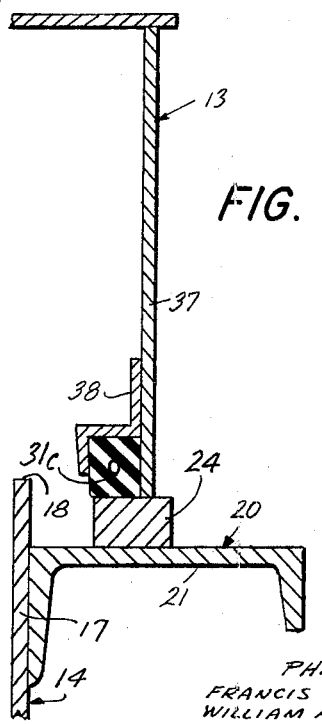

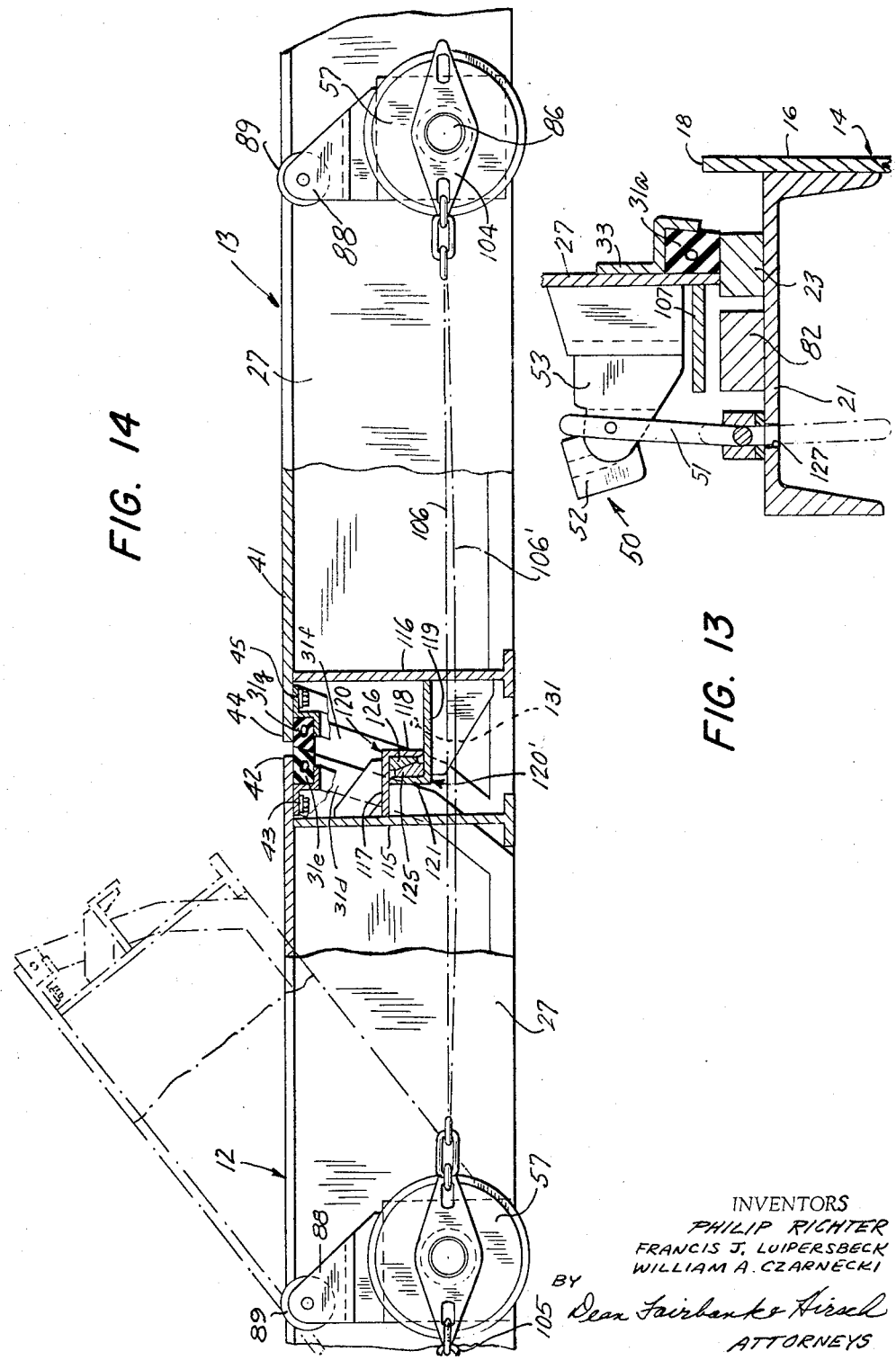

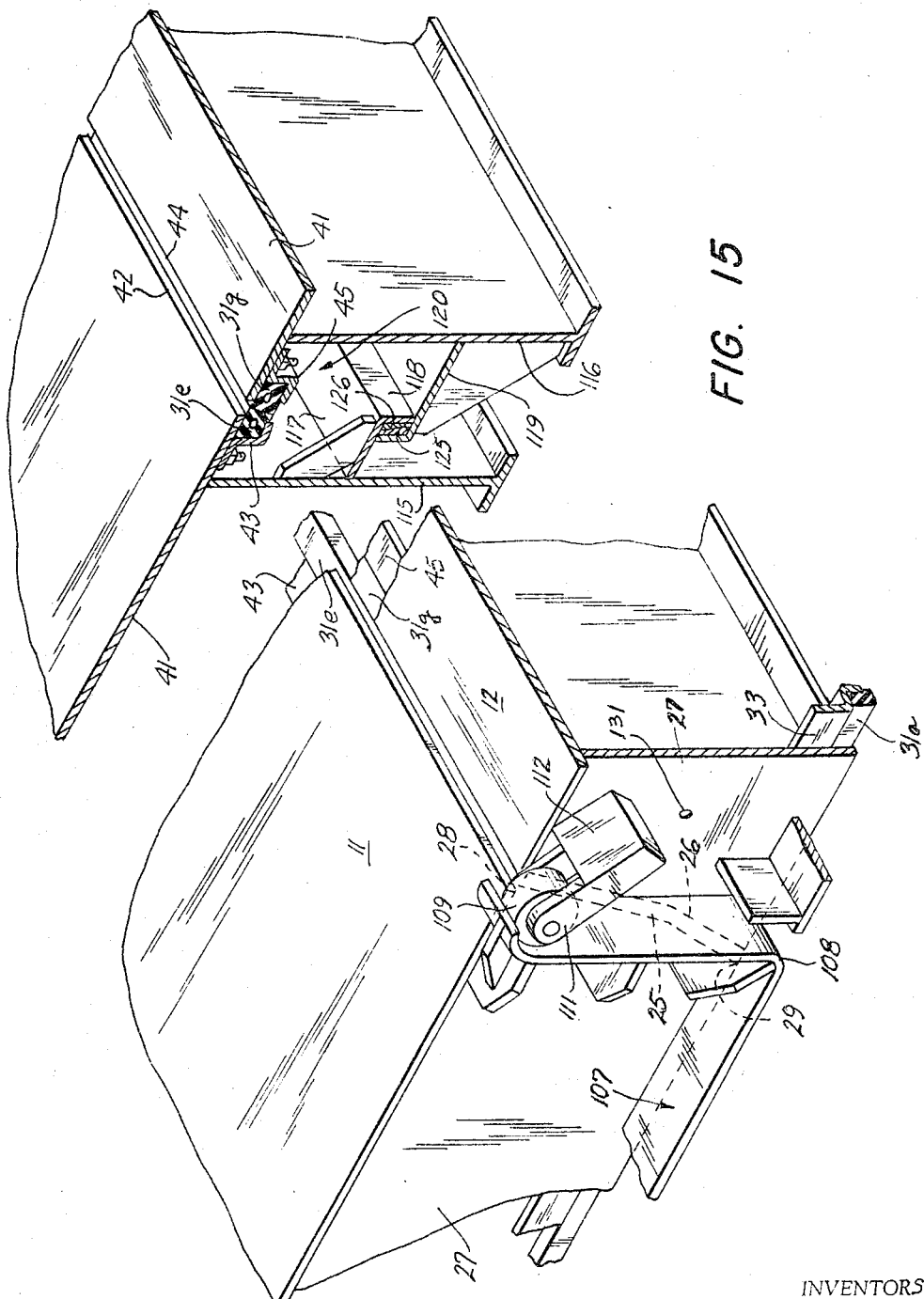

United States Patent Office 3,285,217
Patented Nov. 15, 1966

3,285,217
HATCH COVER ASSEMBLY
Philip Richter, Bethlehem, Francis J. Luipersbeck, Northampton, and William A. Czarnecki, Coopersburg, Pa., assignors to Fuller Company, Catasauqua, Pa., a corporation of Delaware
Filed Feb. 18, 1965, Ser. No. 433,574
7 Claims. (Cl. 114—202)

As conducive to an understanding of the invention, it is noted that where a plurality of substantially rectangular hatch cover panels are to be positioned in side by side horizontal position over a hatchway to close the latter and in a vertical stowed position at one end of the hatchway clear of the latter when the hatchway is to be open, if the hatchway is of considerable length, in order that the vertical height of the panels in stowed position is not too great, which would be undesirable in that they would interfere with the height of the winch platform and consequently result in raising of the center of gravity of the ship to a point detrimental to the stability of the ship, the individual panels would have to be relatively narrow in width and hence a relatively large number of panels are required.

When each of such plurality of panels carries a pair of spaced rollers at each end which ride along tracks on each side of the hatchway so that the panels may be moved between such closed and open positions, as by pulling the panel remote from the stowage position toward and away from the later, as cargo is generally piled on top of the closed panels, in order to prevent excessive load on the shafts of each roller when the panels are in such closed position, the lower edges of the skirt plates of each panel are designed to rest on sealing bars around the coaming of the hatchway and the rollers are normally spaced from the tracks. As a result, before the panels can be moved to open position, it is necessary that both of the rollers on the ends of each panel be moved into engagement with the associated track and the lower edge of the skirt plate of each panel be moved vertically away from the sealing bar.

With a large hatchway and a consequently large number of panels, where each roller must be individually moved to effect the desired movement of the roller into engagement with the track and movement of the lower edge of the skirt plate away from the sealing bar, the time required to actuate such large number of rollers adds greatly to the cost of unloading the ship.

Where the panels are of the watertight type with gaskets at their lower edges that also engage the sealing bar to form such watertight seal, the need to effect vertical displacement of the panels is enhanced as the gaskets must be moved clear of the sealing bars before the panels can be moved in a generally horizontal plane in order to prevent rubbing of such gaskets against the sealing bar with resultant destruction of the gaskets and failure of the watertight seal.

Where abutting gaskets are provided between the adjacent transverse edges of adjacent panels to form a seal when the panels are in closed position, and such gaskets are not substantially flush with the top surfaces of the panels, water would collect in the crevice thus formed and when the panels are moved to open position this water would fall into the hatchway with resultant damage to the cargo.

If such abutting gaskets do not press dependably against each other, an effective seal would not be provided and where manually operated latches are utilized to bring such abutting seals into engagement, in addition to the added cost of such latches, the time required to operate the same would add to the cost of unloading the ship.

It is accordingly among the objects of the invention to provide a hatch cover installation of the above type which with a single roller at each end of each of the panels (except the panel most remote from the stowage area which has two rollers), riding on tracks extending along each side of the hatchway, will permit ready movement of the panels from side by side horizontal closed position over the hatchway, to vertical position clear of the hatchway when in fully opened stowed position without rubbing of the gaskets adjacent the lower edges of the skirt plates of the panels against the sealing bars, which, when the panels have moved from stowed position to a side by side horizontal position will bring adjacent transverse edges of the respective panels together to provide a watertight seal therebetween without need for latches between adjacent panels and which, when in closed position will provide a complete watertight seal over the hatchway with the shafts mounting the rollers free from any load.

According to the invention, these objects are accomplished by the arrangement and combination of elements hereinafter described and more particularly recited in the claims.

In the accompanying drawings in which are shown one of various possible embodiments of the several features of the invention:

FIG. 1 is a side elevational view of the installation,

FIG. 2 is a perspective view thereof,

FIG. 3 is a fragmentary detail perspective view of a portion of the roller tracks adjacent the stowage area, FIG. 4 is a detail view on an enlarged scale of a stabilizing roller when the associated panel is in vertical position, FIG. 5 is a top plan view of a pusher roller, FIG. 6 is a side elevational view taken along line 6—6 of FIG. 5, FIG. 7 is a side elevational view on an enlarged scale of the inboard roller and mount therefor, FIG. 8 is a sectional view taken along line 8—8 of FIG. 7, FIG. 9 is a view of the inboard roller taken along line 9—9 of FIG. 2, FIG. 10 is a view of the outboard roller taken along line 10—10 of FIG. 2, FIG. 11 is a detail sectional view of the side edge of the panel adjacent the stowage area taken along line 11—11 of FIG. 2, FIG. 12 is a detail sectional view of the side edge of the panel remote from the stowage area taken along line 12—12 of FIG. 2, FIG. 13 is a view of the latch mechanism on an enlarged scale taken along line 13—13 of FIG. 2, FIG. 14 is a side elevational view partly in cross section and on an enlarged scale showing the self engaging interlocking brackets on two adjacent panels and the sealing means therebetween, and FIG. 15 is a fragmentary perspective view with parts broken away also showing the self engaging interlocking brackets and the sealing means between adjacent panels.

Referring now to the drawings, as shown in FIG. 1, the hatch cover installation comprises a plurality of individual substantially rectangular hatch cover panels, three of which are illustratively shown designated 11, 12, 13 designed to be positioned in side by side relation in a substantially horizontal plane when in closed position so as to extend transversely across a coaming 14 which rises from the deck 15 of a ship around the hatchway thereof.

Extending laterally outward from the sides 16 and ends 17, 17' of the coaming 14, as shown in FIGS. 2, 9, 10, 11 and 12 adjacent the upper edge 18 thereof are substantially U-shaped channel members 19 and 20, each of which extends substantially the length of the associated side or end of the coaming, respectively, the plane of the cross piece 21 of the channel members being slightly below the upper edge 18 of the coaming.

Each of the channel members 19 has a sealing bar 23, substantially rectangular in cross section, extending along the length thereof spaced from the outer surface of the side walls 16 of the coaming 14 to form a gutter therebetween, said sealing bars 23 having their top surface slightly below the upper edge of the coaming as is clearly shown in FIGS. 9 and 10.

In addition, as is clearly shown in FIGS. 11 and 12, a sealing bar 24, also substantially rectangular in cross section, extends the length of each of the channel members 20 at the ends of the coaming and spaced from the outer sides of each of the ends 17, 17' thereof to form gutters therebetween, said sealing bar 24 also having its top surface slightly below the upper edge 18 of the coaming.

The adjacent inner edges 25, 26 of the end walls or skirts 27 of the adjacent pairs of panels 11, 12 and 12, 13 respectively, are complementarily inclined as shown in FIGS. 6 and 15 for example, to facilitate pivotal movement of the panels in the manner hereinafter to be described. Thus, such edges 25, 26 are inclined from the upper end 28 of each of said edges 25, 26 to the lower end 29 thereof and toward the end wall 17' of the coaming as shown in FIG. 6.

Each of the panels 11, 12, 13 has an associated gasket 31 to provide a watertight seal with respect to the sealing bars 23, 24 and to the adjacent panels. As is clearly shown in FIGS. 9 and 10, each of the gaskets 31 has a portion 31a extending along each of the lower edges 32 of the end walls or skirts 27 of said panels on the inner surfaces of said end walls, said portions 31a of the gaskets being retained in position by a retainer bracket 33 secured to the inner surfaces of said end walls.

As is clearly shown in FIG. 11, the side wall or skirt 35 of panel 11 is positioned outwardly of the coaming wall 17' and a portion 31b of the gasket 31 extends along the inner surface of side wall 35 of panel 11 at its lower edge, being secured in place by a retainer bracket 36. Similarly, as shown in FIGS. 2 and 12, the side wall or skirt 37 of panel 13, is positioned outwardly of the coaming wall 17 and a portion 31c of the gasket 31 extends along the inner surface of side wall 37 of panel 13 at its lower edge, being secured in place by a retainer braket 38.

The gasket portions 31a, 31b and 31c are so positioned that their lower surfaces 34, when the gaskets are not compressed, will extend slightly below the lower edges 32 of the respective walls 27, 35 and 37.

As is clearly shown in FIGS. 5 and 6, the gasket 31 of panel 11 also has a portion 31d which rises up the inclined edge 25 and then extends the length of the panel as at 31e adjacent the undersurface of its top wall 41 along the inner edge 42 thereof, being retained in place by a retainer bracket 43 so that the portion 31e extends outwardly beyond said edge 42.

Similarly, the gasket 31 of the panel 12 has a portion 31f which rises up its inclined edge 26 and then extends the length of the panel as at 31g adjacent the undersurface of its top wall 41 along the inner edge 44 thereof, being retained in place by a retainer bracket 45 so that the portion 31g extends outwardly beyond said edge 44.

With the panels 11 and 12 in closed position, as shown in FIGS. 5, 14 and 15, for example, the portions 31d, 31f and 31e, 31g will extend into the junction between the adjacent edges 25, 42 and 26, 44 of the closed panels 11, 12 to engage one another and be deformed, thereby to form a watertight seal.

The arrangement of the gaskets 31 above described with respect to the adjacent edges 25, 42 and 26, 44 of panels 11, 12, is duplicated with respect to the corresponding edges of panels 12, 13.

Each of the panels 11, 12 and 13 illustratively has transverse beams 116 and 115 adjacent its inner and outer edges respectively.

The beams 115 of each of the panels 11 and 12 has the horizontal leg 117 of an L-beam 120 secured thereto with the vertical leg 118 depending from the outer edge thereof. The beams 116 of each of the panels 12 and 13 has the horizontal leg 119 of an L-beam 120' secured thereto in a plane below that of the leg 117 when the panels are in closed position as shown in FIG. 14 and FIG. 15, the vertical leg 121 rising from the outer edge of leg 119.

The width of each of the horizontal legs 117 and 119 is such that with the panels in closed position, the vertical leg 118 of panel 11 will extend over the horizontal leg 119 of panel 12 and the vertical leg 121 of panel 12 will extend beneath the horizontal leg 117 of panel 11.

Each of the vertiacl legs 118, 121 has a complementary beveled bar 126, 125 which define camming surfaces and when engaged will interlock the adjacent pairs of panels in side by side horizontal position as will be more fully described hereinafter and will provide desired compression of the engaging gasket portions 31d, 31f and 31e, 31g.

Suitable latches are provided to draw the panels into sealing engagement with the sealing bars to form a watertight seal between the panels and coaming in the closed hatched position of the panels. Illustratively, as shown in FIGS. 2 and 13, latches 50 are spaced around the periphery of the coaming, each of the latches having a pivoted locking ring member 51 adapted to engage a hook 52 carried by a bracket 53 mounted on the skirt plates of the respective panels. The ring member 51, when the latch is locked, will be under tension to urge the panels downwardly against the sealing bars 23, 24 to deform gaskets 31 and to form a watertight seal between the panels and coaming. As any suitable latch of the above type may be used and as the latch per se forms no part of the invention, it will not be further described.

As a result of the gasket arrangement above described, when the panels are in the closed horizontal position shown and the latches 50 are in locked position, the lower edges 32 of the skirt plates 27, 35, 37 of the panels will be retained against the sealing bars 23, 24 (FIGS. 9 to 12 inclusive). The portions 31a, 31b and 31c of the gaskets 31 will thus be pressed tightly against said sealing bars to form a watertight seal with respect thereto and as previously described, the portions 31d, 31e and 31f, 31g will also respectively engage to form a watertight seal, the seal effected by the engagement of gasket portions 31e, 31g being substantially flush with the top walls 41 of the panels.

The panels are designed to be moved between the closed position shown in FIG. 2, for example, when they are in side by side position in substantially a horizontal plane, and the open position in which they will be stacked in vertical position in a substantially rectangular stowage space 55 at one end of the hatchway as shown in FIG. 1.

To this end, a plurality of flanged rollers 56, 57 are provided and are mounted on the skirt plates or end wall ends 27 of each of the panels. Each of the rollers 56 which will be hereinafter identified as the inboard roller, is rotatably mounted on skirt plate 27 adjacent the edge 26 of panels 12 and 13 and the edge 26′ of panel 11.

Although the rollers 56 may be mounted in any suitable manner, as illustratively shown in FIGS. 7 and 8, a pair of spaced parallel substantially rectangular blocks 58, 59 are secured as by welding to skirt 27 and extend outwardly therefrom. A bearing plate 61 extends between and is secured as by screws 62 to the ends of blocks 58, 59, said plate 61 having a circular bearing opening 63 axially aligned with a circular bearing opening 64 in a bearing plate 65 secured against skirt 27.

Mounted in bearing openings 63, 64 are suitable bushings in which are rotatably mounted the journal portions 67 of elements 65 and 66 respectively, each of which has a flange extending radially of its journal portion 67 and forming a side plate 67′, the upper ends of the side plates 67′ being joined by a cross piece 68 to define a yoke 68′, said cross piece having a socket 69 secured thereto and designed to receive the lower end of an actuating bar 70.

The journals 67 of elements 65 and 66 have axially aligned bores 71 which are parallel to and axially displaced from the journal axis. Extending through bores 71 is a stud shaft 72 on which said roller 56 is mounted, the axis of the shaft and roller thus being eccentric with respect to the journal axis.

As shown in FIG. 7, the movement of yoke 68′ and hence of elements 65, 66 is limited in clockwise and counterclockwise direction by abutments or stop pins 74 and 74′, respectively, which extend inwardly from bearing plate 61 and against which the opposed straight edges 75 and 75′ of the yoke 68′ are adapted to alternately abut. The yoke may be locked in its actuated position as hereinafter described by means of a pin 76 which may be inserted through openings 77 in fingers 78 of a female clevis rising from block 59 and opening 79 in a finger 81 secured to socket 69 when said finger 81 is interposed between fingers 78, with openings 77 and 79 in alignment.

The flanged rollers 56 are designed to ride on a track or rail 82 hereinafter called the inboard track which is secured to the top surface of each channel member 19 as shown in FIG. 9 and extends the length thereof outwardly of the sealing bar 23. It is of course understood that the track 82 and the associated sealing bar 23 could be formed from a single bar if desired.

With the yoke 68′ of each of the inboard rollers in the position shown in FIG. 7, when the panels are in closed position with the edges 32 of the skirt plates thereof resting on sealing bars 23, 24, the bottom edges of the rollers 56, as shown in FIGS. 7 and 9, will be slightly spaced from the associated portion of track 82. With this arrangement, the entire weight of each panel is carried by the lower edges 32 therefor which are in contact with thee sealing bars, so that if cargo is piled on the panels, there will be no strain on the stud shafts 72 carrying the rollers 56.

The flanged roller 57, hereinafter referred to as the outboard roller, is rotatably mounted on each skirt plate 27 and located between the center of each panel and the trailing edge 25 of panels 11 and 12 and the edge 25′ of panel 13.

To mount each of the rollers 58 as shown in FIG. 10, a bracket 84 is secured to each end wall or skirt 27 and extends outwardly therefrom, the outer end of the bracket having a block 85 secured thereto. Extending from said block is a stud shaft 86 on which the roller 57 is rotatably mounted, the roller 57 being positioned outwardly of the roller 56 as clearly shown in FIGS. 9 and 10.

Secured to said block 85 and rising therefrom is an arm 87, the upper end of which is conformed as a yoke, between the legs 88, 88′ of which a stabilizing roller 89 is rotatably mounted.

The stowage space 55 which illustratively is on the left end of the hatchway as shown in FIGS. 1 and 2 has two parallel side walls 92 formed by structural members secured to and rising from the deck of the ship.

The upper edge 93 of each of the side walls define tracks which are longitudinally aligned with the outboard rollers 57. Each of the upper edges has a generally horizontal upper portion 94 and an inclined portion 95 which extends downwardly to the adjacent end of the associated channel 19, and a lower generally horizontal portion 96 as shown in FIG. 3.

Thus, when the flanged outboard rollers 57 reach the end of the channels 19 they will ride along horizontal portion 96, up inclined portion 95 and along horizontal portion 94.

Extending parallel to the side walls 92 and positioned inwardly thereof, are structural walls 98, the upper edge 99 of each of which forms a track that is aligned with the associated inboard track 82 is curved downwardly as at 101 at its outer end 102. The inboard rollers 56 when they reach the end of the associated track 82 will then ride along track portion 99 and down the curved end 101 thereof.

In order to connect the panels 11, 12 and 13 so that they may be moved from open to closed position, each of the stud shafts 86 on which the outboard roller 57 is rotatably mounted, idly mounts a link 104, to the ends of which are secured the ends of chains 105, 106. Thus, the chains 105, 106 extend respectively between the rollers 57 of panels 11, 12 and panels 12, 13.

To facilitate movement of the panels from closed to open position, each of the end walls 27 of the panels 11 and 12 has a flange 107 secured thereto as is clearly shown in FIGS. 5, 6 and 15, and extending laterally outward therefrom. The flange 107 extends downwardly from the top surface of each panel adjacent the edge 25 thereof and then is curved as at 108 and extends along the lower edge of the panel.

Adapted to react against each of the flanges 107 is an associated pusher roller 109 each rotatably mounted between a pair of arms 111 (FIG. 5) extending from a bracket 112 affixed to the panels 12 and 13 adjacent the edge 26 thereof.

With the construction above described, it is apparent that each of the panels 11 and 12 when in closed position only has a single roller 56 on each end wall 27 adjacent its edges 26′, 26, that will be supported by the tracks 82 when the panels are to be moved to open position. Each end wall 27 of panel 13 which is the furthest away from the storage area, has an additional roller 56 mounted near its outer edge 25′.

In the operation of the hatch cover for movement thereof from closed to open position, the latches 50 are moved to open position by pivoting the member 52 thereof in a counterclockwise direction from the position shown in FIG. 13. As a result, the ring member 51 will be released from the hook 52 and the ring member may be moved downwardly through appropriate openings 127 in the chanel member so that it will not interfere with the wheel brackets or tracks or prevent free access to the open hatchway.

Thereupon a bar 70 (FIG. 7) is inserted into each of the sockets 69 of the rollers 56, and the yokes are pivoted to move the roller downwardly against the tracks, for example in a clockwise direction from the position shown in FIG. 7 and further pivotal movement of yokes 68′ will jack up the edges of the covers on which the respective rollers are mounted. By reason of the interlocking members 120 and 121, lifting of the inner edges of panels 12 and 13 will lift the outer edges of the adjacent panels, namely panels 11 and 12 respectively. Thus with each panel being jacked at the inner and outer edges, either directly by means of the eccentric roller 56 or by means of roller 56 through interlocking members 120 and 121, all of the gasket portions 31a will be moved out of engagement and away from the associated track.

Although three panels are illustrated, the invention may be utilized for any number of panels, depending on the length of the hatchway. Since only one jacking roller 56 is required on each skirt plate 27 due to the interlocking members 120 and 121, except for the panel most remote from the storage area which in all cases requires two, the time required to lift the panels to permit movement thereof to open position is greatly reduced as compared to installations where each panel has two rollers which require jacking prior to opening the cover, particularly in applications involving the use of a multiplicity of panels.

Although the pivotal movement of the yoke 68' will move the axis shaft 72 past the center, that is, to the left of the axis of the journals 67 as illustrated, which would normally retain the yoke in actuated position, to insure that it will not be dislodged, the pin 76 is inserted into openings 77, 79 of fingers 78 and 81 after they have been moved into alignment by the pivoting of yoke 68' against stop 74.

A cable from the winch or boom of the ship is connected to a U-shaped bracket 130 on each of the end walls 27 of the panel 13 adjacent its edge 25'. When tension is applied to the cables, the panel 13 will be moved to the left, the rollers 56 riding on tracks 82.

At the same time as panel 13 moves to the left, due to the action of the pusher rollers 109 carried by panel 13 against the flanges 107 of panel 12, and the action of pusher roller 109 carried by panel 12 against the flanges 107 of panel 11, both of the panels 12 and 11 will also move to the left.

Although each of the panels 11, 12 between the stowage area 55 and the panel 13 remote therefrom is only supported by a single roller at the inner edge of each skirt plate 27 riding on track 82, since the outer edge of each of the panels 11, 12 is supported by the engaging interlocking means, namely, members 120 and 121 as shown in FIGS. 14 and 15, the entire gasket portions 31a will remain spaced from the sealing bars 23. As a result, the panels 11, 12 and 13 will move readily toward the stowage area 55 without rubbing action of the gaskets against sealing bars 23.

As the panels continue to move to the left under the urging of the ship's cable, the rollers 56 of panel 11 will ride along the horizontal portions 99 of inner walls 98 and the outboard rollers 57 will reach the substantially horizontal portions 96 of outer walls 92 and will engage and ride on the upper edges of walls 92. After the outboard rollers on panel 11 have engaged outer wall 92, the inboard rollers 56 on panel 11 will reach the downwardly curved portions 101 of inner walls 98 and will move downwardly and panel 11 will be pivoted about the outboard rollers 57 in a counterclockwise direction as viewed in the drawings.

This pivotal movement will cause the interlocking members 120 and 121 to disengage and break the seal between abutting portions 31d, 31f and 31e, 31g of panels 11 and 12.

By reason of the fact that the pusher rollers 109 are pressing against flanges 107, lateral displacement or skewing of the panel 11 is precluded so that the rollers 57 thereof will not move off their associated tracks and the rollers 109 will exert positive pushing force against the flanges 107 of panel 11 even as panel 11 pivots.

The outboard rollers 57 of panel 11 will continue upwardly along inclined portion 95 of side walls 92, due to the action of the pusher rollers 109 of panel 12 against flanges 107 of panel 11, said rollers 57 riding up said inclined portion 95 as the rollers 56 ride down the curved portions 101 of walls 98.

When the panel 11 pivots to vertical position, as shown in FIG. 4, the stabilizing roller 89 will be moved into engagement with the horizontal portion 94 of wall 92. The two rollers 56 and 89 are spaced from each other so as to inhibit swinging and prevent consequent slamming of the panels together with resultant undesirable noise and possibility of injury to the panels.

With continued movement of the panels under the action of the cable, the other panels 12 and 13 will follow the same course of movement and the pusher rollers 109 of panel 12 will move the first panel 11 completely to the left in the stowage space 55 and the pusher roller 109 of panel 13 will move panel 12 to the left. Thus, when the cable has moved the panel 13 into the stowage space 55, the hatchway will be completely open with the panels displaced therefrom and hanging in vertical position and with the chains 105, 106 at this time hanging freely as shown.

To close the hatchway, it is merely necessary to apply tension to the brackets 130 in the opposite direction, namely away from the stowage area. As the panel 13 is moved to the right, the chain 106 will become taut to cause the next adjacent panel 12 to move to the right.

Referring to FIG. 14, as shown in broken lines, as the rollers 56 (not shown) of panel 12 ride up the vertical portions of walls 98 and around the curved portions 101 thereof, the tension of chain 106 and location of wheels 57 will cause the panel 12 illustrated in the drawings to pivot in a clockwise direction.

The chains 105 and 106 connecting adjacent covers are of a length such that when panel 12 pivots from the stowed into a substantially horizontal position, the locking member 120 of panel 12 will overlap the locking member of panel 13 to thereby self-engage with one another, with the wedges or cam surfaces 126 and 125 being in contact with one another. Due to the shape of the complementary surfaces 126 and 125 and to the weight and impact of the pivoting panel 12, panel 12 will be cammed forward causing the gasket portions 31d, 31f and 31e, 31g to be deformed to effect a watertight seal at the transverse joint and adjacent edges between panels 12 and 13.

Due to the location of flange 107 of panel 12 and pusher rollers 109 of panel 13, movement of panels 12 toward panel 13 is limited which will prevent overdeformation of said gasket portions.

Similarly, panels 11 and 12 will self-engage to interlock and form a watertight seal between their adjacent edges when panel 11 is pivoted out of the stowage area into a substantially horizontal position.

Inasmuch as the seals 31e, 31g are substantially flush with the top plates of the panels, any pocket for the collection of water is substantially eliminated. In the event any water should get past these gasket portions, for example during opening of the covers, the water would be caught on the horizontal leg 119 of angle 120' which forms a gutter and such water may be discharged through a suitable opening 131 in the skirt plate 27 of the panel.

After the panels are in side by side horizontal position covering the hatchway, the yokes may be pivoted in a direction to cause the panels to be lowered and the roller 56 raised to remove support of the panels therefrom, and latches 50 are positioned to force the lower edges of the skirts 27, 35, 45 on the sealing bars 23, 24 to thereby deform the gaskets 31 against said sealing bars to provide a watertight seal.

With the construction above described, a highly efficient hatch cover assembly is provided which will afford complete access to the hatchway when in open position and which may readily be moved between open and closed positions by means of a cable extending from the ship's boom, for example, without likelihood of dislodgment of the rollers carrying the panels, from the associated tracks, which hatchway when the panels are in closed position will be watertight, and may have the gaskets forming a part of such seal moved away from the associated sealing bars with a minimum of manual manipulation so that the panels may be rapidly set for opening and which panels are self-releasing and self-engaging without the need of manual latches at the transverse joints.

As many changes could be made in the above construction and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. A cover assembly for a hatchway comprising a plurality of substantially rectangular panels adapted to be positioned in side by side relation in substantially a horizontal plane over said hatchway when in closed position, each of the adjacent edges of adjacent panels having a sealing gasket extending the length thereof and protruding beyond said edges, a storage area at one end of the hatchway adapted to accommodate all of the panels in substantially vertical position, said panels being movable toward said stowage area to be pivoted to substantially a vertical position when in open stowed position, a track extending along each side of said hatchway, a roller rotatably mounted on each end of each panel adjacent the edge of the associated panel that is adjacent the end of the hatchway toward which the panels are moved to open position, the ends of the panel most remote from the end of the hatchway toward which the panels are moved to open position having an additional roller adjacent the other edge thereof, said rollers being adapted to ride on said tracks, means to pivot said panels from horizontal to vertical position, and complementary means carried respectively by said panels on the adjacent edges thereof adapted to engage when said panels are pivoted to closed horizontal position to retain said adjacent edges together, and releasably supporting the edge of a preceding panel in fixed position with respect to the edge of the next adjacent panel, said complementary means comprising a rigid member secured respectively to each of the adjacent edges of said panels, each rigid member having an arm extending outwardly toward the other rigid member, said arms overlapping and being vertically spaced when said panels are in closed position, the arm carried by the panel adjacent the stowage area having a depending arm engaging the top surface of the other arm when the panels are in closed position, and the arms carried by the next successive panel having an upstanding arm engaging the undersurface of the outwardly extending arm of the preceding panel, said depending and upstanding arms being in spaced parallel relation to each other, complementary beveled surfaces carried by said depending and upstanding arms adapted to engage when said panels are in closed position to move said sealing gaskets into engagement, and means carried by the ends of adjacent panels to limit the minimum spacing between the edges of adjacent panels to prevent abutment of said edges with resultant crushing of the gasket portions extending along said edges, flexible means interconnecting said panels, said means comprising a plurality of elongated chains, each affixed at its ends to adjacent panels, said chains being taut when said panels are moved toward closed position and being of length such that when said complementary beveled portions engage they will slacken slightly.

2. A cover assembly for a hatchway comprising a plurality of substantially rectangular panels adapted to be positioned in side by side relation in substantially a horizontal plane over said hatchway when in closed position, each of the adjacent edges of adjacent panels having a sealing gasket extending the length thereof and protruding beyond said edges, a stowage area at one end of the hatchway adapted to accommodate all of the panels in substantially vertical position, said panels being movable toward said stowage area to be pivoted to substantially a vertical position when in open stowed position, a track extending along each side of said hatchway, a roller rotatably mounted on each end of each panel adjacent the edge of the associated panel that is adjacent the end of the hatchway toward which the panels are moved to open position, the ends of the panel most remote from the end of the hatchway toward which the panels are moved to open position having an additional roller adjacent the other edge thereof, said rollers being adapted to ride on said tracks, means to pivot said panels from horizontal to vertical position, and complementary means carried respectively by said panels on the adjacent edges thereof adapted to engage when said panels are pivoted to closed horizontal position to retain said adjacent edges together, and releasably supporting the edge of a preceding panel in fixed position with respect to the edge of the next adjacent panel, said complementary means comprising a rigid member secured respectively to each of the adjacent edges of said panels, each rigid member having an arm extending outwardly toward the other rigid member, said arms overlapping and being vertically spaced when said panels are in closed position, the arm carried by the panel adjacent the stowage area having a depending arm, and the arm carried by the panel carrying said roller having an upstanding arm engaging the undersurface of the outwardly extending arm of the preceding panel, said depending and upstanding arms being in space parallel relation to each other, complementary beveled surfaces carried by said depending and upstanding arms adapted to engage when said panels are in closed position to move said sealing gaskets into engagement.

3. The combination set forth in claim 2 in which flexible means are provided interconnecting said panels, said means comprising a plurality of elongated chains each affixed at its ends to the adjacent panels, said chains being taut when said panels are moved toward closed position and being of length such that when said complementary beveled portions engage they will slacken slightly.

4. The cover assembly set forth in claim 2 in which means are provided to support the weight of each panel independently of said rollers and said tracks when the panels are in closed position, and means associated with the rollers to bring the rollers into engagement with the tracks and to lift the panels, whereby the rollers will support the weight of the panels.

5. The hatch cover assembly set forth in claim 2 in which a second roller is rotatably mounted on each end of each of said panels, the first of said rollers being positioned adjacent the edge of the associated panel adjacent said stowage area, and adapted to ride on said track and the other roller being positioned between the center of said panel and the other edge thereof and clear of said tracks, a second track extending along said stowage area parallel to said first track, said second rollers being positioned to ride on said second tracks, the portions of the first tracks extending along said stowage area having their free ends curved downwardly and spaced from the end of the stowage area, whereby as the first rollers of each panel preceding the next adjacent panel successively ride down said curved portions and the other rollers of each panel ride along said second track, said panels will successively be pivoted about said other rollers to hang in substantially vertical position in said stowage area.

6. The hatch cover assembly set forth in claim 5 in which said second rollers extend outwardly of the first rollers and said second track has an upwardly inclined portion and a horizontal portion, said second rollers riding up said inclined portions onto said horizontal portions, whereby as the first rollers of each panel preceding the next adjacent panel successively ride down said downwardly curved portion of the first tracks, the second rollers will ride up said upwardly inclined portion to pivot said panels about said other rollers, and means are provided to retain said panels in vertical position without pivotal movement thereof when said other rollers ride along said horizontal portions of said second tracks.

7. The hatch cover assembly set forth in claim 2 in which a rigid member is secured to each of the ends of the associated panels adjacent the edge thereof near which said roller is mounted, said rigid member being secured to all of the panels except the panel adjacent the end of the hatchway toward which the panels move to open position, each of the preceding panels has a reaction member secured to each end adjacent the other edge thereof against which the free ends of said rigid members are adapted to abut, said abutment limiting the minimum spacing between the edges of adjacent panels to prevent abutment of said edges with resultant crushing of the gasket portion extending along said edges.

References Cited by the Examiner

UNITED STATES PATENTS

| 2,707,928 | 5/1955 | Farrell | 114—203 |
| 2,771,136 | 11/1956 | Lecomte | 114—202 |
| 2,853,131 | 9/1958 | Kummerman | 114—201 |
| 3,145,039 | 8/1964 | Richter | 114—202 |
| 3,183,874 | 5/1965 | Barlow | 114—202 |

FOREIGN PATENTS

| 611,848 | 11/1948 | Great Britain. |
| 946,045 | 1/1964 | Great Britain. |
| 1,309,828 | 10/1962 | France. |

MILTON BUCHLER, *Primary Examiner.*

ANDREW H. FARRELL, *Examiner.*

UNITED STATES PATENT OFFICE
CERTIFICATE OF CORRECTION

Patent No. 3,285,217 November 15, 1966

Philip Richter et al.

It is hereby certified that error appears in the above numbered patent requiring correction and that the said Letters Patent should read as corrected below.

Column 9, line 49, for "arms" read -- arm --; column 10, line 30, for "space" read -- spaced --.

Singed and sealed this 12th day of September 1967.

(SEAL)
Attest:

ERNEST W. SWIDER
Attesting Officer

EDWARD J. BRENNER
Commissioner of Patents